April 7, 1942.    J. B. PARSONS    2,279,243
SOLENOID ACTUATED VALVE
Filed July 23, 1940
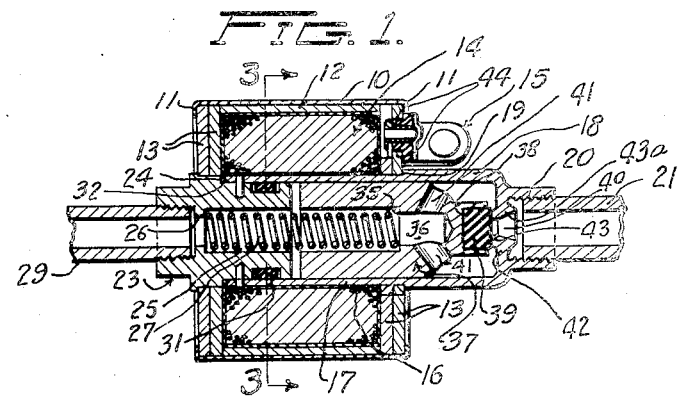
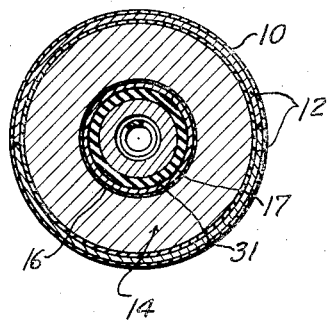
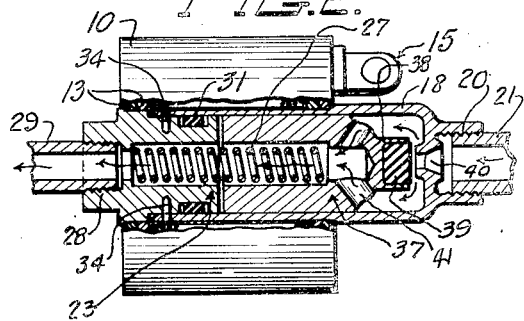
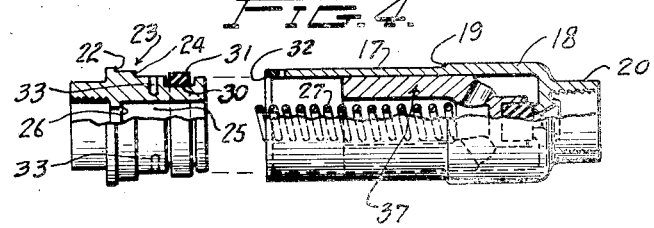
Inventor
John B. Parsons
By Malcolm W. Fraser
Attorney Patented Apr. 7, 1942

2,279,243

UNITED STATES PATENT OFFICE 2,279,243

SOLENOID ACTUATED VALVE

John B. Parsons, Toledo, Ohio

Application July 23, 1940, Serial No. 346,983

3 Claims. (Cl. 137—139)

This invention relates to valve structures but more particularly to a solenoid actuated valve and an object is to produce a valve structure of this character adapted for the handling of fluids particularly liquids, parts of which are satisfactorily sealed by the use of a member which is compressed automatically in the assembly of the parts, thereby eliminating the use of relatively expensive packing glands, washers, screws and other parts which ordinarily contribute to the expense and weight of the assembly.

Another object is to increase the efficiency of the solenoid operated valve by so designing the parts that a relatively small amount of current is required for actuating the valve member.

A further object is to produce a new and improved solenoid operated valve assembly which is relatively inexpensive to manufacture on a production basis, easy to assemble, and sturdy and reliable in operation.

Other objects and advantages of the invention will hereinafter appear and for purposes of illustration but not of limitation, an embodiment of the invention is shown on the accompanying drawing in which Figure 1 is a longitudinal sectional elevation of a solenoid operated valve;

Figure 2 is a side elevation partly in section of the valve assembly showing the valve in its open or unseated position;

Figure 3 is a transverse sectional view on the line 3—3 of Figure 1; and

Figure 4 is a side elevation partly in section of the plug, sleeve and valve parts preparatory to assembly thereof.

Referring to the drawing, a relatively thin-walled sheet metal tubular casing 10 is formed with crimped over ends 11. Within the casing is an electromagnet comprising a pair of semi-circular metallic members 12, at each end of which is a pair of metallic washers 13. Arranged between the pairs of washers 13 is a coil 14 of wiring, the terminals of which are connected to a bracket 15 which is suitably mounted in apertures 44 in the right-hand washers 13. Insulated from the coil 14 by a relatively thin fiber tube 16 is a thin-walled metallic sleeve 17. The wall 18 of the sleeve 17 on the outside of the casing 12 is enlarged thereby providing a shoulder 19 which abuts against the adjacent washer 13. The wall 18 terminates in a reduced internally screw-threaded attaching nipple 20 to which a portion 21 of a main supply tube is attached.

For holding the left-hand washers 13 in place, a shoulder 22 is formed on the plug 23 and abuts against the adjacent washer 13. A second shoulder 24 is formed on the plug 23 and abuts against the free end of the sleeve 17. The dimensions of the shoulder 24 are such that the peripheral surface of the sleeve 17 and the adjacent peripheral surface of the plug 23 are substantially flush with each other. The shoulders 19, 22 and 24 prevent axial displacement of the electromagnet assembly. At the outer end of the plug 23 is a reduced internally screw-threaded attaching nipple 28 to which a portion 29 of the main supply tube is attached.

A rubber ring 31 loosely fits within an annular groove 30 formed in the peripheral surface of the plug 23 near its inner end. As shown in Figure 4, the ring 31 normally projects outwardly beyond the outer surface of the plug 23 so that when assembled, the ring is compressed, creating a substantially fluid-tight joint between the plug 23 and the sleeve 17. Compression of the ring 31 is automatically accomplished during assembly of the parts by a chamfered or cam surface 32 on the inner end of the sleeve 17 upon insertion of the plug 23 within the sleeve 17. For holding the plug 23 and the sleeve 17 in assembled relation and against axial movements, pins 34 are inserted through holes in the sleeve 17 and into sockets 33 in the plug 23. A fluid passage 25 extends axially through the plug 23 and formed in the passage is an internal shoulder 26 against which one end of a coil spring 27 abuts.

A valve 37 has limited sliding movement in the sleeve 17 toward and away from the plug 23 and has a fluid passage 36 in alignment with the passage 25. An internal shoulder 35 in the passage 36 forms a seat for the opposite end of the coil spring 27. The spring 27 normally urges the valve 37 to its closed position. The outer end of the valve 37 is formed with a reduced portion which has a socket 38 in which is disposed a yieldable rubber plug 39. The outer end wall of the socket 38 is crimped over the plug 39 to retain it in place. Lateral or diverging passages 41 spaced inwardly from the socket 38 afford communication between the inside of the sleeve portion 18 and the axial fluid passage 36.

Formed adjacent the attaching nipple 20 is an internal partition 42 provided with oppositely projecting axial extensions 43 and 43a which have a flared passage 40 therethrough. The rubber plug 39 seats against the axial extension 43 to prevent the flow of the fluid when the valve is in its normal or closed position.

The operation of the valve is as follows: The solenoid is energized by means of current from a battery or other suitable source of supply (not shown), and the valve 39 moves to its open position as shown in Figure 2, under the influence of the field which is created, thereby compressing the spring 27. Fluid, such as oil, enters the inside of sleeve 18 from the tube portion 21 where it divides to flow through the several lateral passages 41 into the axial passage 36, thence through the passage 23 to the tube portion 29. Upon de-energizing of the solenoid, the valve 37 is released and automatically forced to its closed position by the coil spring 27.

An important characteristic of the invention is the use of a compressed rubber sealing device which is not only simple and efficient but also readily lends itself to production methods and greatly facilitates ease of assembly. The employment of such a sealing device of this character makes it possible to use thinner walls in the construction of the valve containing sleeve, thereby increasing the efficiency of the valve and reducing the amount of current required to operate it. It will be manifest that the parts are so designed that assembly is facilitated and the size and weight are kept as low as possible.

It is to be understood that numerous changes in details of construction, arrangement and operation may be effected without departing from the spirit of the invention especially as defined in the appended claims.

What I claim is:

1. In a solenoid controlled valve, a thin-walled sleeve, a chamfered surface at one end of said sleeve, a plug having a recessed portion in the side thereof, said recessed portion extending circumferentially of said sleeve; a compressed resilient rubber member in said recessed portion engaging the interior wall of said sleeve and adapted to be compressed by said chamfered surface during assembly of the parts, pins projecting through said sleeve and into said plug for preventing relative axial movement between said plug and said sleeve, a shoulder on said sleeve, a shoulder on said plug, an electro-magnet including a coil, metallic washers at opposite ends of said coil, and a metallic ring surrounding said coil, said electro-magnet disposed between said shoulders and surrounding said sleeve, a thin-walled metallic casing surrounding said electro-magnet, and crimped over edges on said casing for holding the parts of said electro-magnet in assembled relation between said shoulders.

2. A solenoid controlled valve comprising a sleeve, a thin-walled extension at one end of said sleeve, a tubular attaching nipple at the opposite end of said sleeve, a chamfered surface at the end of said thin-walled extension, an internal partition in said sleeve, a valve seat of thicker cross-section than said partition having a fluid passage and centrally disposed in said partition, a plug adapted to telescope with said sleeve, having an annular groove on the outer surface thereof, and also having an axial fluid passage, a compressible resilient rubber ring within said groove normally projecting beyond the outer surface of said plug, said ring compressed to form a sealing contact between said plug and said sleeve by said chamfered surface upon insertion of said plug within said sleeve, a tubular attaching nipple on the outer end of said plug, an external shoulder on said sleeve, an external shoulder on said plug, an electro-magnet surrounding said thin-walled extension and including a coil, metallic washers at opposite ends of said coil, and a metallic ring surrounding said coil, a casing enclosing said electro-magnet, crimped over edges on said casing for holding said electro-magnet in assembled relation between said external shoulders, a second shoulder on said plug against which said thin-walled extension abuts, a valve slidable in said sleeve having an axial fluid passage, said valve also having a plurality of smaller lateral passages in the side thereof to afford fluid communication between the inside of said sleeve and said valve fluid passage, a socket at one end of said valve, a rubber plug in said socket, crimped over edges on said socket for holding said rubber plug therein, said rubber plug seating against said valve seat when said valve is in its normal or closed position, pins projecting through said sleeve extension and into said plug for preventing relative axial movement of said plug and said sleeve, an internal shoulder near the outer end of each of said fluid passages in said valve and said plug, and a coil spring disposed in said fluid passages between said shoulders normally urging said valve to its closed position.

3. In a solenoid controlled valve, a thin-walled sleeve, a chamfered surface at one end of said sleeve, a plug having a recessed portion in the side thereof, said recessed portion extending circumferentially of said sleeve; a compressed resilient rubber member in said recessed portion engaging the interior wall of said sleeve and adapted to be compressed by said chamfered surface during assembly of the parts, pins projecting through said sleeve and into said plug for preventing relative axial movement between said plug and said sleeve, a shoulder on said sleeve, a shoulder on said plug, an electromagnet including a coil, metallic washers at opposite ends of said coil, and a metallic ring surrounding said coil, said electro-magnet disposed between said shoulders and surrounding said sleeve, a thin-walled metallic casing surrounding said electro-magnet, and means for holding the parts of said electro-magnet in assembled relation between said shoulders.

JOHN B. PARSONS.